United States Patent
Pacifici et al.

(10) Patent No.: US 8,370,802 B2
(45) Date of Patent: Feb. 5, 2013

(54) SPECIFYING AN ORDER FOR CHANGING AN OPERATIONAL STATE OF SOFTWARE APPLICATION COMPONENTS

(75) Inventors: Giovanni Pacifici, New York, NY (US); Hidayatullah Habeebullah Shaikh, Mohegan Lake, NY (US); Jian Yin, Bronx, NY (US)

(73) Assignee: International Business Machines Corporation, Armonk, NY (US)

(*) Notice: Subject to any disclaimer, the term of this patent is extended or adjusted under 35 U.S.C. 154(b) by 1540 days.

(21) Appl. No.: 11/856,871

(22) Filed: Sep. 18, 2007

(65) Prior Publication Data
US 2009/0077090 A1 Mar. 19, 2009

(51) Int. Cl.
*G06F 9/44* (2006.01)
(52) U.S. Cl. ...................................... 717/120
(58) Field of Classification Search ............... 717/120
See application file for complete search history.

(56) References Cited

U.S. PATENT DOCUMENTS

| | | |
|---|---|---|
| 4,674,038 A | 6/1987 | Brelsford |
| 5,682,535 A | 10/1997 | Knudsen |
| 5,807,790 A | 9/1998 | Gupta et al. |
| 6,094,528 A | 7/2000 | Jordan |
| 6,510,448 B1 | 1/2003 | Churchyard |
| 6,633,916 B2 | 10/2003 | Kauffman |
| 6,734,873 B1 | 5/2004 | Herf et al. |
| 6,775,699 B1 | 8/2004 | DeLuca et al. |
| 6,802,062 B1 | 10/2004 | Oyamada |
| 6,848,106 B1 | 1/2005 | Hipp |
| 6,917,963 B1 | 7/2005 | Hipp et al. |
| 6,941,410 B1 | 9/2005 | Traversat et al. |
| 7,010,693 B1 * | 3/2006 | Lee et al. ........... 713/176 |
| 7,013,462 B2 | 3/2006 | Zara et al. |
| 7,093,247 B2 | 8/2006 | Ashworth et al. |
| 7,127,713 B2 | 10/2006 | Davis et al. |
| 7,131,122 B1 | 10/2006 | Lakhdhir |
| 7,142,848 B2 | 11/2006 | Owen et al. |
| 7,150,015 B2 | 12/2006 | Pace et al. |
| 7,206,827 B2 | 4/2007 | Viswanath et al. |
| 7,275,081 B1 * | 9/2007 | Katz et al. ........... 709/203 |
| 7,313,793 B2 | 12/2007 | Traut et al. |
| 7,356,679 B1 | 4/2008 | Le et al. |

(Continued)

FOREIGN PATENT DOCUMENTS

| | | |
|---|---|---|
| JP | 2004005650 A | 1/2004 |
| JP | 2005174201 A | 6/2005 |

(Continued)

OTHER PUBLICATIONS

U.S. Appl. No. 11/618,946, filed Jan. 3, 2007, Chess et al.

(Continued)

*Primary Examiner* — Jay Morrison
(74) *Attorney, Agent, or Firm* — Yee & Associates, P.C.; William Stock (57) ABSTRACT

Managing a distributed software application is provided. Metadata describing a set of dependencies of a set of software components is identified in the distributed software application from data associated with the set of software components. Then, a sequence for changing an operational state of the set of software components of the distributed software application is identified from the metadata to form an identified sequence. Thereafter, the operational state of the set of software components is changed using the identified sequence.

19 Claims, 6 Drawing Sheets

U.S. PATENT DOCUMENTS

| | | | |
|---|---|---|---|
| 7,376,693 B2 | 5/2008 | Neiman et al. | |
| 7,478,387 B2 | 1/2009 | Abelite et al. | |
| 7,505,995 B2 * | 3/2009 | Grealish et al. | 1/1 |
| 7,506,336 B1 | 3/2009 | Ninan | |
| 7,506,338 B2 | 3/2009 | Alpern et al. | |
| 7,539,974 B2 | 5/2009 | Beck et al. | |
| 7,587,453 B2 | 9/2009 | Bhrara et al. | |
| 7,590,983 B2 | 9/2009 | Neiman et al. | |
| 7,603,443 B2 | 10/2009 | Fong et al. | |
| 7,676,803 B2 | 3/2010 | Zhao et al. | |
| 7,730,183 B2 | 6/2010 | Brown et al. | |
| 7,730,480 B2 | 6/2010 | Isaacson | |
| 7,743,363 B2 | 6/2010 | Brumme et al. | |
| 7,761,865 B2 | 7/2010 | Stienhans et al. | |
| 7,779,091 B2 | 8/2010 | Wilkinson et al. | |
| 7,865,888 B1 | 1/2011 | Qureshi et al. | |
| 7,870,153 B2 | 1/2011 | Croft et al. | |
| 7,908,313 B2 | 3/2011 | Lurie et al. | |
| 7,949,677 B2 | 5/2011 | Croft et al. | |
| 7,954,087 B2 | 5/2011 | Zenz et al. | |
| 8,073,926 B2 | 12/2011 | Traut et al. | |
| 8,078,824 B2 | 12/2011 | Sugumar et al. | |
| 8,108,855 B2 | 1/2012 | Dias et al. | |
| 8,145,751 B2 | 3/2012 | Creamer et al. | |
| 8,145,760 B2 | 3/2012 | Dinda et al. | |
| 8,191,060 B2 | 5/2012 | Malasky et al. | |
| 8,225,314 B2 | 7/2012 | Martins et al. | |
| 2002/0065877 A1 | 5/2002 | Kowtko et al. | |
| 2004/0010598 A1 | 1/2004 | Bales et al. | |
| 2004/0015968 A1 | 1/2004 | Neiman et al. | |
| 2004/0060048 A1 | 3/2004 | Abelite et al. | |
| 2005/0041588 A1 | 2/2005 | Kim et al. | |
| 2005/0050175 A1 | 3/2005 | Fong et al. | |
| 2005/0108593 A1 | 5/2005 | Purushothaman et al. | |
| 2005/0114494 A1 * | 5/2005 | Beck et al. | 709/224 |
| 2005/0191991 A1 | 9/2005 | Owen et al. | |
| 2005/0268280 A1 | 12/2005 | Fildebrandt | |
| 2006/0155674 A1 | 7/2006 | Traut et al. | |
| 2006/0184936 A1 | 8/2006 | Abels et al. | |
| 2006/0184937 A1 | 8/2006 | Abels et al. | |
| 2006/0277542 A1 | 12/2006 | Wipfel | |
| 2007/0006205 A1 | 1/2007 | Kennedy et al. | |
| 2007/0046791 A1 | 3/2007 | Wang et al. | |
| 2007/0089111 A1 | 4/2007 | Robinson et al. | |
| 2007/0124731 A1 | 5/2007 | Neiman et al. | |
| 2007/0157172 A1 | 7/2007 | Zenz et al. | |
| 2007/0157185 A1 | 7/2007 | Semerdzhiev et al. | |
| 2007/0162892 A1 | 7/2007 | Zenz et al. | |
| 2007/0233881 A1 | 10/2007 | Nochta et al. | |
| 2007/0234334 A1 | 10/2007 | Araujo, Jr. et al. | |
| 2007/0234337 A1 | 10/2007 | Suzuki et al. | |
| 2007/0234356 A1 | 10/2007 | Martins et al. | |
| 2007/0283314 A1 | 12/2007 | Browning et al. | |
| 2007/0294676 A1 | 12/2007 | Mellor et al. | |
| 2007/0300220 A1 | 12/2007 | Seliger et al. | |
| 2007/0300221 A1 | 12/2007 | Hartz et al. | |
| 2008/0034071 A1 | 2/2008 | Wilkinson et al. | |
| 2008/0127169 A1 | 5/2008 | Malasky et al. | |
| 2008/0155537 A1 | 6/2008 | Dinda et al. | |
| 2008/0163171 A1 | 7/2008 | Chess et al. | |
| 2008/0163194 A1 | 7/2008 | Dias et al. | |
| 2008/0184225 A1 | 7/2008 | Fitzgerald et al. | |
| 2008/0222234 A1 | 9/2008 | Marchand et al. | |
| 2009/0089860 A1 | 4/2009 | Forrester et al. | |
| 2009/0113395 A1 | 4/2009 | Creamer et al. | |
| 2009/0276771 A1 | 11/2009 | Nickolov et al. | |
| 2010/0083218 A1 | 4/2010 | Bender | |
| 2011/0119670 A1 | 5/2011 | Sugumar et al. | |
| 2011/0119748 A1 | 5/2011 | Edwards et al. | |

FOREIGN PATENT DOCUMENTS

| | | |
|---|---|---|
| JP | 2005292956 A | 10/2005 |
| WO | 03021516 A1 | 3/2003 |

OTHER PUBLICATIONS

Notice of Allowance regarding U.S. Appl. No. 11/854,185, dated Sep. 27, 2011, 16 pages.

Office Action regarding U.S. Appl. No. 11/854,185, dated May 24, 2011, 23 pages.

Final Office Action regarding U.S. Appl. No. 11/618,946, dated Jan. 24, 2012, 12 pages.

Notice of Allowance regarding U.S. Appl. No. 11/618,946, dated Jul. 20, 2012, 16 pages.

Office Action issued on Aug. 3, 2011 for U.S. Appl. No. 11/618,946, 8 pages.

Canon et al., "Virtual Machine Emulation Facility for Performance Evaluation," International Business Machines Corporation, IBM Technical Disclosure Bulletin, Dec. 1978, pp. 3004-3005.

Crameri et al., "Staged Deployment in Mirage, an Integrated Software Upgrade Testing and Distribution System," SOSP'07, Stevenson, Washington, Oct. 14-17, 2007, pp. 221-236.

Figueiredo et al., "A Case for Grid Computing on Virtual Machines", Proceedings of the 23rd International Conference on Distributed Computing Systems, pp. 1-10, May 22, 2003, URL:http://ieeexplore.ieee.org/xpls/abs_all.jsp?arnumber=1203506>.

Kherfi et al., "Image Retrieval from the World Wide Web: Issues, Techniques, and System", ACM Computing Surveys, vol. 36, No. 1, Mar. 2004, pp. 35-67.

Krsul et al., "VMPlants: Providing and Managing Virtual Machine Execution Environments for Grid Computing", ACM Digital Library, 2004 IEEE, pp. 1-12.

Nicolae et al., "Going Back and Forth: Efficient Multideployment and Multisnapshotting on Clouds," HPDC'11, San Jose, California, Jun. 8-11, 2011, pp. 147-158.

Snyder et al., "Visibility Sorting and Compositing without Splitting for Image Layer Decompositions," ACM Digital Library, Proceedings of the 25th annual conference on Computer graphics and interactive techniques, 1998, pp. 219-230.

Sundararaj et al., "Towards Virtual Networks for Virtual Machine Grid Computing", Online, pp. 1-14, May 7, 2004, URL:http://portal.acm.org/citation.cfm?id=1267242.1267256>.

Villa et al., "Scalable Transparent Checkpoint-Restart of Global Address Space Applications on Virtual Machines Over Infiniband," CF'09, Ischia, Italy, May 18-20, 2009, pp. 197-206.

International Search Report and Written Opinion of the International Searching Authority, dated Mar. 13, 2008, regarding International Application No. PCT/EP2007/064117, 10 pages.

Wolinsky et al., "On the Design of Virtual Machine Sandboxes for Distributed Computing in Wide-Area Overlays of Virtual Workstations," IEEE VTDC, Second International Workshop on Virtualization Technology in Distributed Computing, Tampa, Florida, Nov. 17, 2006, 8 pages.

* cited by examiner

TABLE 302

| MAJOR COMPONENTS (304) | REQUIRED COMPONENTS MIDDLEWARE (306) |
|---|---|
| DATA SERVER | DB2 UDB ESE V8.2<br>ITDS V5.2<br>BPEDP<br>LDAP DB<br>PORTAL DB |
| UI SERVER | WebSphere PORTAL V5.1<br>ITDS CLIENT V5.2 |
| PROCESS SERVER | WBI-SF V5.1<br>ITDS CLIENT V5.2 |
| APPLICATION SERVER | WAS ND V5.1<br>ITDS CLIENT V5.2<br>DB2 ALPHABLOX V8.2 |
| CLI CLIENT | WAS APPLICATION CLIENT V5.1 |

*FIG. 3*

TABLE 402

| TOPOLOGIES (404) | TOPOLOGY NODES/VM IMAGES (406) | MAJOR COMPONENTS FOR EACH NODE (408) |
|---|---|---|
| SINGLE SERVER + CLIENT | A<br>B | CLI CLIENT (A)<br>DATA SERVER (B)<br>UI (B)<br>PROCESS SERVER (B)<br>APPLICATION SERVER (B) |
| TWO SERVERS + CLIENT | A<br>C<br>D | CLI CLIENT (A)<br>DATA SERVER (C)<br>UI (D)<br>PROCESS SERVER (D)<br>APPLICATION SERVER (D) |
| FOUR SERVERS + CLIENT | A<br>C<br>E<br>F<br>G | CLI CLIENT (A)<br>DATA SERVER (C)<br>UI (F)<br>PROCESS SERVER (G)<br>APPLICATION SERVER (H) |

SPECIFYING AN ORDER FOR CHANGING AN OPERATIONAL STATE OF SOFTWARE APPLICATION COMPONENTS

BACKGROUND OF THE INVENTION

1. Field of the Invention

The present invention relates generally to an improved data processing system and in particular to a computer implemented method and apparatus for managing a distributed software application. More particularly, the present invention is directed to a computer implemented method, apparatus, and computer usable program product for utilizing metadata for changing an operational state of software application components distributed over a cluster of virtual and/or physical machines.

2. Description of the Related Art

A distributed software application is a software application that is created from a set of interrelated software components disseminated over two or more physical and/or virtual machines. The software components may be, for example, an operating system, a middleware system, or an application program. In addition, each component may include one or more subcomponents. For example, if a software component is broadly defined as the entire software stack installed on a physical or virtual machine, then that software component may include a subset of software components, such as the operating system and one or more software programs executing on the virtual machine.

Although the use of distributed software applications promotes scalability, the set of software components of the distributed software application are more difficult to manage. These difficulties arise from the sometimes complex dependencies of the various software components. For example, the operation of a second software component may depend upon the operation of a first software component. During a restart process, an attempt to restart a second component of a distributed software application without restarting the first software component may cause an error or prevent the distributed software application from restarting.

Examples of otherwise routine management tasks that are more difficult to perform on distributed software applications include software upgrading, hardware maintenance, service migration, or other similar forms of system administration that requires the changing of an operation state of the distributed software application. The operational state of the distributed software application is a state of operation of the distributed software application. In particular, the state of operation may either be an active state or a suspended state. In an active state, the distributed software application is functional and capable of processing data. In a suspended state, the distributed software application is offline and/or incapable of processing data. Thus, changing an operational state of a distributed software application, may be, for example, suspending an active distributed software application or starting a suspended distributed software application. Because the distributed software application is formed from a set of software components, changing the operational state of the distributed software application involves changing the operational state of the set of software components forming the distributed software application.

Difficulties attributed to changing the operational state of the distributed software application may be attributed to the dependencies of the various software components that form the distributed software application. In addition, software components may be subjected to certain temporal limitations that require those software components to be available at specified times. These dependencies and temporal limitations, as well as other conditions that may exist, complicate the creation of a process for starting and stopping of a distributed software application.

One currently used method for deriving a process for properly stopping and starting a set of components of a distributed software application requires a systems administrator with intimate knowledge of the distributed software application to derive a sequence for stopping and restarting individual software components. This method may be a time consuming process if the distributed software application includes many software components. Furthermore, as a distributed software application is upgraded and modified, dependencies may change, thereby requiring the systems administrator to continually modify the process. This method is inefficient and may lead to costly errors and unnecessary downtime.

BRIEF SUMMARY OF THE INVENTION

The illustrative embodiments described herein provide a computer implemented method, apparatus, and computer usable program product for managing a distributed software application. The process identifies metadata describing a set of dependencies of a set of software components in the distributed software application from data associated with the set of software components. The process then identifies a sequence for changing an operational state of the set of software components of the distributed software application from the metadata to form an identified sequence. Thereafter, the process chances the operational state of the set of software components using the identified sequence.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
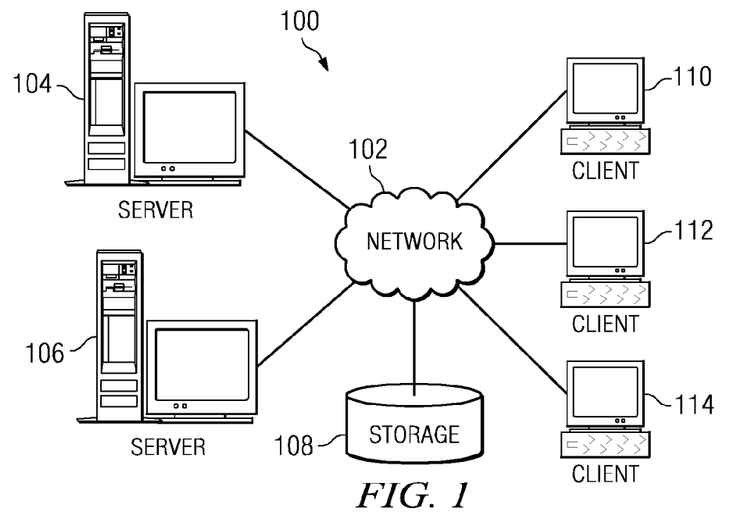
FIG. 1 is a pictorial representation of a network data processing system in which illustrative embodiments may be implemented.
Figure 2:
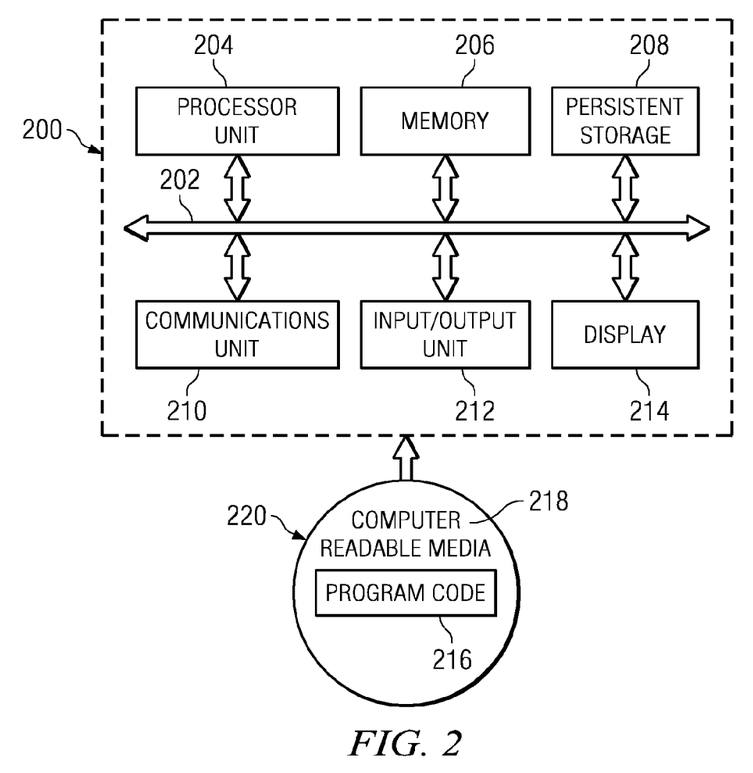
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing system in which illustrative embodiments may be implemented. Network data processing system 100 is a network of computing devices in which embodiments may be implemented. Network data processing system 100 contains network 102, which is the medium used to provide communications links between various devices and computers connected together within network data processing system 100. Network 102 may include connections, such as wire, wireless communication links, or fiber optic cables. The depicted example in FIG. 1 is not meant to imply architectural limitations. For example, data processing system 100 also may be a network of telephone subscribers and users.

In the depicted example, server 104 and server 106 connect to network 102 along with storage unit 108. In addition, clients 110, 112, and 114 are coupled to network 102. Clients 110, 112, and 114 are examples of devices that may be utilized for transmitting or receiving audio-based communication in a network, such as network 102. Clients 110, 112, and 114 may be, for example, a personal computer, a laptop, a tablet PC, a network computer, a hardwired telephone, a cellular phone, a voice over internet communication device, or any other communication device or computing device capable of transmitting data. In the depicted example, server 104 provides data, such as boot files, operating system images, and applications to clients 110, 112, and 114. Clients 110, 112, and 114 are coupled to server 104 in this example. Network data processing system 100 may include additional servers, clients, computing devices, and other devices for transmitting or receiving audio-based communication. The clients and servers of network data processing system 100 may be configured to host one or more software components that form a distributed software application. Alternatively, the clients and servers of network data processing system 100 may host one or more virtual machines for hosting one or more software components that form a distributed software application.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as, for example, an intranet, a local area network (LAN), a wide area network (WAN), a telephone network, or a satellite network. FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples.

In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media 218 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, memory 206 or a cache. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

The illustrative embodiments described herein provide a computer implemented method, apparatus, and computer usable program product for managing a distributed software application. The set of software components is one or more software components that form a distributed software application. The process identifies metadata describing a set of dependencies of a set of software components in the distributed software application from data associated with the set of software components. The process then identifies a sequence for changing an operational state of the set of software components of the distributed software application from the metadata to form an identified sequence. Thereafter, the process changes the operational state of the set of software components using the identified sequence.

The operational state of the set of software components is a state of operation of the software component. In particular, the state of operation may either be an active state or a suspended state. In an active state, a software component is functional and capable of processing data. In a suspended state, a software application is offline and/or not capable of processing data. Thus, changing an operational state of a software component, may be, for example, suspending an active software component or starting a suspended software component.

In the different examples, suspending an active software component means ceasing the operation of an active software component. Thus, suspending an active software component may include terminating the execution of the software component. As a result, starting a suspended software component may include restarting a software component that was not executing.

In addition, because a distributed software application is formed from one or more software components, the operational state of the distributed software application is also directly related to the operational state of the set of software components. However, changing the operational state of a distributed software application may require that the operational state of certain components is changed before others. As such, a sequence for changing the operational state of a set of software components that form a distributed software application is first identified before the operational state of the distributed software application is changed.

An identified sequence for changing the operational state of the set of software components is an ordering of the software components of the set of software components that forms the distributed software application. The order in which software components are listed in the identified sequence is based on a dependency of a software component on other software components in the set of software components. A dependency is a relationship between two or more software components. In particular, a first software component that is dependent upon a second software component requires or depends upon the second software component in order to properly function.

In a simple example, one software component may be programmed to collect data and another software component may be programmed to calculate a value using the data collected by the first software component. A third software component may format the value calculated by the second software component so that the value may be presented to a user. The operation of the second software component depends upon the first software component. Likewise, the operation of the third software component depends upon the second software component.

If, during a restart of a suspended distributed software application formed from the three software components described above, an attempt is made to restart the second software component before the first software component, then the distributed software application may not start. The distributed software application may not start because the second software component, lacking the necessary output from the first software component, may not restart. If the second software component does not restart, then the third software component, which depends upon the second software component, also may not restart. Consequently, the distributed software application formed from these three software components may not restart. Thus, in this example, the sequence for restarting the distributed software application formed from the first, second, and third software components may involve restarting the first software component, followed by the second software component, and then the third software component.

In addition, the order of software components listed in the sequence depends upon the existence of temporal limitations. Temporal limitations are restrictions limiting the time at which a software component may be started or suspended. For example, a software component that backs up a server at a predefined time every day cannot be suspended during that predefined time of day. Thus, the predefined time of day is a temporal limitation preventing a software component from being suspended.

Figure 3:
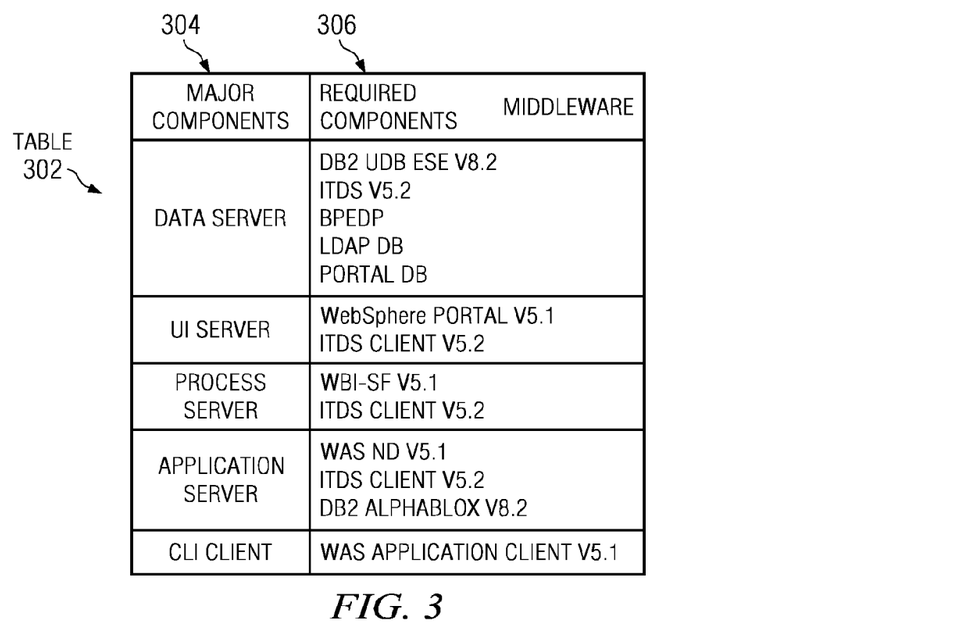
FIG. 3 is a table of components of an exemplary software solution having topologies in accordance with an illustrative embodiment.

FIG. 3 is a table of components of an exemplary software solution. In particular, table 302 is a table of components of an IT Service Management (ITSM) solution that is used to manage large-scale information technology systems. Column 304 contains entries for each of the major components. Column 306 contains entries for the required middleware components for the corresponding major component and regular component.

Figure 4:
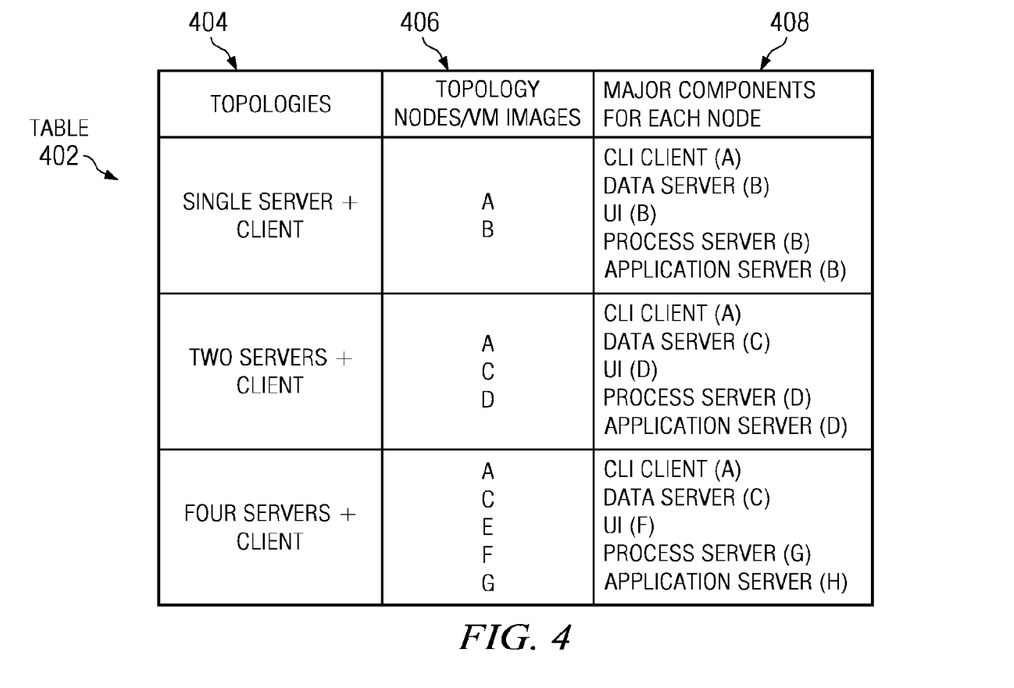
FIG. 4 is a table of topologies supported by the a distributed software application in accordance with an illustrative embodiment.

FIG. 4 is a table of topologies supported by the software solution in FIG. 3. Column 404 includes entries for each of the supported topologies. Column 406 contains entries for the names of the topology nodes or virtual machine images that comprise the supported topology entry in column 404. Column 408 contains entries for major components from table 302 in FIG. 3 that comprise the topology nodes in the entry of column 406. Following the name of each major component in each entry of column 408 is the name corresponding to the specific topology node in the entry of column 406 to which the major component belongs. The depicted topologies represent a particular mapping between one or more software components of a solution and one or more machines or topology nodes where these components are installed. Usually, a solution may be deployed in one or more topologies.

Figure 5:
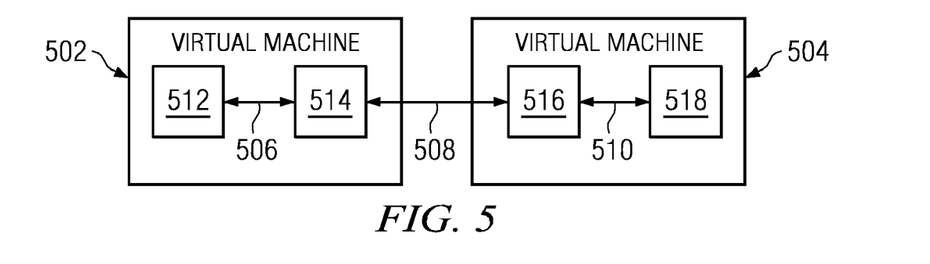
FIG. 5 is a block diagram of a deployed set of software components in accordance with an illustrative embodiment.

FIG. 5 is a block diagram illustrating a deployed set of software components in accordance with an exemplary embodiment. In particular, the software components are deployed in virtual machine images. The virtual machine images in FIG. 5 may be deployed by a data processing system, such as data processing system 200 in FIG. 2.

FIG. 5 shows two virtual machine images 502 and 504. Virtual machine image 502 comprises components 512 and 514. Virtual machine image 504 comprises components 516 and 518. The connections between components 512 and 514 and 516 and 518 are connections 506 and 510, respectively. Connections 506 and 510 remain inside the boundary of the respective virtual machine images while the connection between components 514 and 516, connection 508, traverses the boundary of the virtual machine images.

The connection between components 512 and 514 can be established and configured at the time of the creation of virtual machine image 502 while the connection between components 514 and 516 needs to be established and configured at the time of deployment. FIG. 5 illustrates a reason why deploying software solutions as virtual machine images is so appealing. That is, the customers need to handle only a fraction of the total dependencies between the solution components, namely, the dependencies that cross the boundaries of the virtual machines.

In an exemplary embodiment, the virtual machine image is treated as a single software component with well-identified access points. From this perspective, the specific components in a virtual machine image, such as a Linux® operating system, a queue manager, and a database that is only used by the queue manager, is irrelevant. What is relevant is the designed role or capability of the virtual machine image, such as a provider of a queue manager service and the access point(s) of the virtual machine image. Some examples of access points are protocol, address, port, and any other parameter needed to connect to the virtual machine image.

An exemplary embodiment provides for using metadata that describes hardware and software requirements of each virtual machine image, the services the virtual machine image exposes with associated access points, the services that the virtual machine image requires from other components in order to fulfill the role of the virtual machine image in the overall system, and other related metadata. Since the metadata describes hardware and software requirements of each virtual machine image, the metadata may be considered personalized metadata.

An exemplary embodiment provides for a virtual software resource template (VSRT). A virtual software resource template is the set of virtual machine images and metadata. In one example, a virtual software resource template is a collection of one or more freeze-dried software stack(s) with associated metadata. A freeze-dried software stack is a software stack comprised of pre-configured, pre-tuned, and hardened components, such as an operating system, an application server, a database, and a set of applications. A pre-tuned or hardened component is a component whose configuration, all the parameters that influence the behavior of the component at run time, has been already executed and the results stored in the virtual machine image.

Examples of metadata information include, but are not limited to, information such as location of freeze-dried software stack volumes, hardware requirements such as CPU, memory, disk, network, and so forth, for hosting the virtual software resource template, external and internal virtual machine image dependencies, policies associated with capacity, configuration parameters for the solution, and so forth.

Virtual software resource templates may be either simple or composite. A simple virtual software resource template, also called a base virtual software resource template, comprises a single software stack. That is, a base virtual software resource template comprises a virtual machine image and metadata for a single virtual machine. A composite virtual software resource template comprises multiple, finer grained software stacks. That is, a composite virtual software resource template comprises multiple virtual machine images and metadata for multiple virtual machines.

Composite virtual software resource templates contain information about assembling a set of virtual software resource templates into a single distributed application or "solution". Virtual software resource templates may be deployed on a set of physical machines either by running in a virtual container or directly on physical machines like a blade. A virtual container is a program capable of instantiating and running virtual software resource templates, such as VMware® Server. When virtual software resource templates are instantiated on a set of physical machines, one or more virtual software resources (VSRs) are created. A virtual software resource is a resource that is deployed, configured, and running.

An exemplary embodiment provides for a base virtual software resource template comprised of the following metadata information: an identifier, a name, a description, disk image information, hardware profile, software profile, capabilities, configuration, scale-out/clustering, intra-virtual software resource template dependencies, and external dependencies.

An identifier is a globally unique identifier that may act as a primary key for machine identification of the software stack contained in the virtual machine image. A name is a unique name for human identification of the software stack. The description is a short description of the functionality provided by the software stack. Disk image information includes, for example, the location of the disk images. A hardware profile is the virtual machine image hardware requirements. These include, for example, CPU, memory, disk, network, and so forth. This information is used for resource matching during the deployment phase and results in the virtual machine definition.

A software profile includes detailed information about the software installed on the disk images. A disk image is the file image of a virtual disk. A virtual machine can have different virtual disks much like a physical machine can have different hard disks, for example, the operating system version and release information. This information is particularly useful when the virtual software resource template is being extended vertically by the application or when the virtual software resource template is being upgraded, for example, by applying fix-packs to the middleware and/or operating system.

Fix-packs are fixes that software vendors provide for the bugs found in their software that need to be applied by customers on top of their existing software installation for the software to work properly. Capabilities are metadata that express or explain the capabilities provided by the software stack, for example, a J2EE™ application server or a servlet container and so forth. Configuration information is metadata that defines data that is needed for the solution to be customized and configured. The configuration data is provided during the deployment of the virtual software resource template.

Scale-out/clustering information is metadata that identifies the policies associated with scale-out of virtual software resource templates. A computer "cluster" is a group of loosely coupled computers that work together closely so that in many respects they can be viewed as though they are a single computer. Clusters are usually deployed to improve speed and/or reliability over that provided by a single computer, while typically being much more cost-effective than single computers of comparable speed or reliability.

This technique of grouping computers is called "clustering". "Scale-out" in the exemplary embodiments is used to define machines, physical or virtual, that are clustered together to increase throughput and improve speed. The scale-out information is useful at run time for optimal instantiation and placement of virtual machines. The intra-virtual software resource template dependencies are the dependencies between the various software stacks included in the composite virtual software resource template.

For example, IT Service Management (ITSM) Command Line Interface (CLI) client software stack "uses" IT Service Management data server software stack. External dependencies are the dependencies between a virtual machine images and external components. For example, a WebSphere® application server software stack might use a Lightweight Directory Access Protocol (LDAP) server for authentication.

Figure 6:
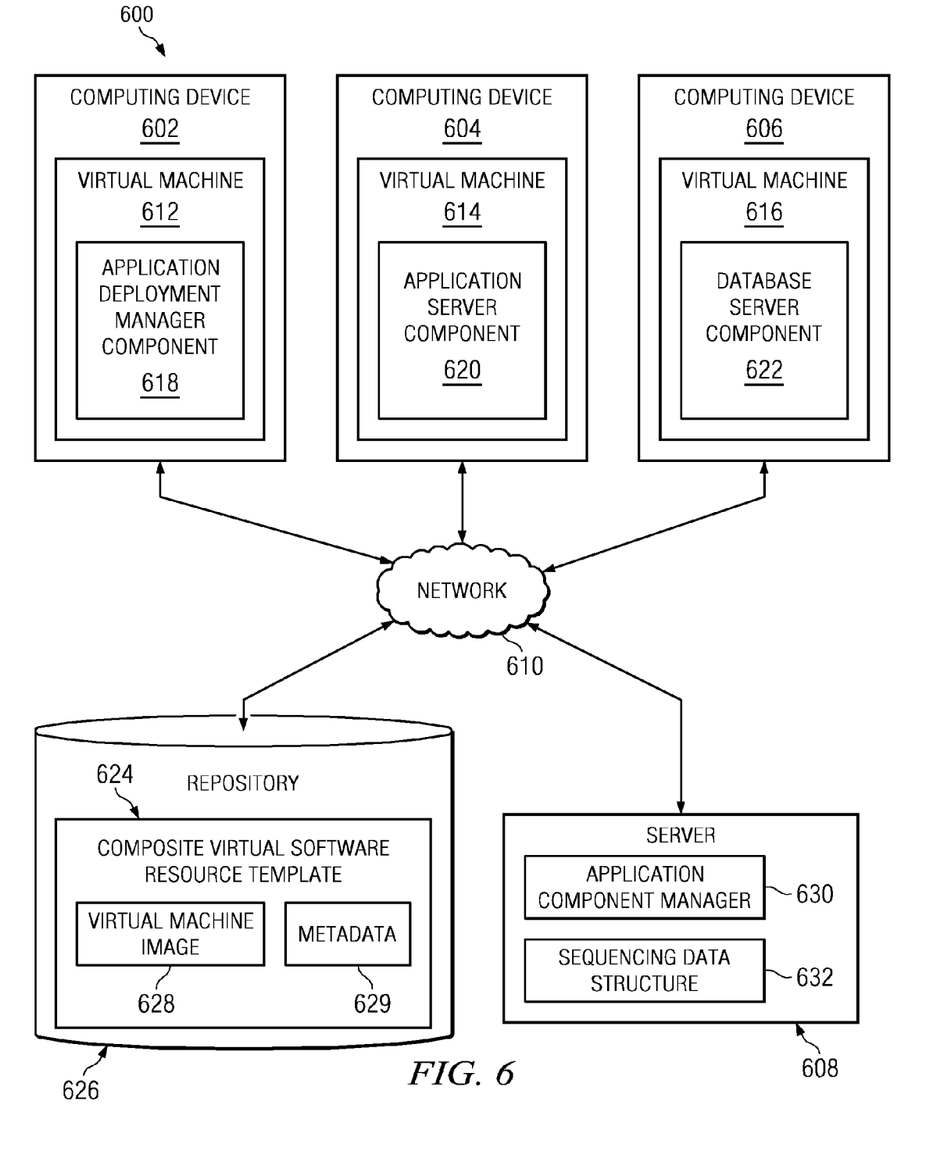
FIG. 6 is a diagram of a system for use in managing a distributed software application comprising a set of software components in accordance with an illustrative embodiment.

Turning now to FIG. 6, a diagram of a system for use in managing a distributed software application comprising a set of software components is depicted in accordance with an illustrative embodiment. System 600 is a network data processing system such as network data processing system 100 of FIG. 1. System 600 includes computing devices 602, 604, and 606, and server 608. Computing devices 602, 604, and 606, and server 608 are computing devices such as client 110 and server 104 in FIG. 1. In addition, computing devices 602, 604, and 606, and server 608 are coupled to network 610. Network 610 is a network, such as network 102 in FIG. 1.

Computing devices 602, 604, and 606 host virtual machines 612, 614, and 616, respectively. Virtual machines 612, 614, and 616 are virtual computing environments created between a computer platform and a corresponding operating system. Each virtual machine, in turn, hosts a software component, the combination of which forms a distributed software application. For example, virtual machine 612 hosts application deployment manager component 618, virtual machine 614 hosts application server component 620, and virtual machine 616 hosts database server component 622.

System 600 is configured to host a distributed software application formed from a set of software components. The set of software components may be one or more software components. In this illustrative example, the distributed software application is formed from three software components. In particular, the combination of application deployment manager component 618, application server component 620, and database server component 622 form the distributed software application. Still more particularly, the distributed software application is a JAVA Platform, Enterprise Edition Application (J2EE®) trade application. J2EE® is a registered trademark of Sun Microsystems, Inc. A J2EE® trade application is a software application operable to process, for example, online commercial transactions such as selling, buying, and browsing of stocks and other commodities, or for facilitating any other type of online commercial application.

More specifically, the J2EE® trade application depicted in FIG. 6 is a Websphere® software application. Websphere® is a registered trademark of International Business Machines Corporation. Websphere® is a software solution that provides a development and deployment environment for basic Web publishing and for transaction-intensive, enterprise-scale e-business applications. Websphere® is operable to host software applications written in J2EE® programming language. However, the illustrative embodiments described herein are not limited solely to a Websphere® application but may also be implemented with respect to any distributed software application.

Application deployment manager component 618, application server component 620, and database server component 622 are software components, each of which may have one or more software subcomponents (not shown). For example, application deployment manager component 618 may include an operating system, a Websphere® application deployment manager, and a J2EE® application. Similarly, application server component 620 may include an operating system, a Websphere® application server, and a J2EE® application. Likewise, database server component 622 may include an operating system, a DB2® server, and an application database for storing data utilized by the DB2® server. DB2® is a registered trademark of International Business Machines Corporation.

In this illustrative example, application deployment manager component 618 is a software component that is configured to provide a centralized administration point for the set of components that form the distributed software application. In addition, application deployment manager component 618 maintains configuration data for each software component of the set of software components. As such, application deployment manager component 618 enables a user to change the configuration of application server component 620 or other software components that form the set of software components.

Application server component 620 is a software component that delivers applications to client systems. In addition, application server component 620 handles most, if not all, of the business logic and data access of the distributed software application.

Database server component 622 is a software component operable to store data for use in the distributed software application. For example, the data necessary for executing the distributed software application are stored in one or more databases of database server component 622. In addition, database server component 622 may have one or more databases for storing the data generated from the transactions that occur through use of the distributed software application.

To properly change the operational state of a distributed software application of FIG. 6, the constituent set of software components are suspended and/or restarted in a particular sequence according to the dependencies of the software component on one another. For example, application deployment manager component 618 is incapable of providing a centralized administration point for the set of components without referencing the data stored or maintained by database server component 622. Similarly, application server component 620 is incapable of properly delivering software applications to clients without the configuration information of application deployment manager component 618. Thus, for example, database server component 622 should be restarted before application deployment manager component 618, and application deployment manager component 618 should be restarted before application server component 620 in order to properly restart the distributed software application formed from these three software components.

The information necessary for identifying a sequence for changing the operational state of a distributed software application is presented in a composite virtual software resource template, such as composite virtual software resource template 624 stored in repository 626. Repository 626 is a storage device, such as, storage unit 108 in FIG. 1 and persistent storage 208 in FIG. 2. In addition, repository 626 may be a library of composite virtual software resource templates storing additional composite virtual software resource templates. The composite virtual software resource templates may be indexed, for example, according to functionality for ease of location by a user.

Composite virtual software resource template 624 includes virtual machine image 628. Virtual machine image 628 is a file representation of a virtual machine, the virtual machine devices, and installed software components. Virtual machine image 628 may be one or more virtual machine images. In one embodiment, virtual machine image 628 includes one virtual machine image for each virtual machine hosting a software component of the set of software components that form a distributed software application. Thus, in the illustrative example in FIG. 6, virtual machine image 628 is three separate virtual machine images corresponding to virtual machine 612, 614, and 616.

Virtualizers, like VMware® Server, instantiate and run virtual machines starting from their file-based representation or image. VMware® Server® is a product of VMware® Inc. Virtual machine image 628 may include a software stack. In this example, a virtual machine image may include an operating system, middleware, and application components. In this example, the virtual machine image may also be a collection of one or more "freeze-dried" or pre-configured software stacks.

Composite virtual software resource template 624 also includes metadata 629. Metadata 629 is data that describes the functionality, configuration, and other attributes of composite virtual software resource template 624, including virtual machine image 628. In particular, metadata 629 may describe a set of dependencies of the software components of the set of software components that form the distributed software application. A set of dependencies is one or more dependencies of one software component upon another software component. For example, a dependency may be assigned to a software component if that software component requires the output or functionality of another software component in order to function.

Metadata 629 may also describe a set of temporal limitations of the software components of the set of software components that form the distributed software application. A set of temporal limitations is one or more time based conditions that specify a window of time that a software component may be required to be operational or alternatively, a window of time that the software component may be suspended. For example, database server component 622 may include an application database subcomponent that stores data for another related software application. The related software application may migrate data to the application database subcomponent at a specified time each day. Consequently, database server component 622 is operational during the time at which the related software application is scheduled to perform the data migration. Thus, a temporal limitation may be described in metadata 629 to insure that database server component 622 is operational during the data migration. A more detailed description of composite virtual software resource templates and metadata is presented in the discussion regarding FIG. 7.

Server 608 includes application component manager 630. Application component manager 630 is a software application operable to manage the distributed software application represented by application deployment manager component 618, application server component 620, and database server component 622. In particular, application component manager 630 is operable to derive a sequence for changing the operational state of the distributed software application. The sequence is an arrangement or list describing the order in which the software components of the distributed software application are to be suspended or restarted. Application component manager 630 determines the sequence based upon the set of dependencies and temporal limitations described within metadata 629.

Application component manager 630 identifies data from metadata 629 describing a set of dependencies and temporal limitations of a set of software components in the distributed software application from data associated with the set of software components. Application component manager 630 may then analyze metadata 629 by utilizing any type of analysis, including, without limitation, static compiler analysis, dynamic analysis, rule-based system analysis, and data mining to extract the dependencies of the set of software components. Application component manager 630 may then identify a sequence for changing an operational state of the set of components.

The sequence for changing the operational state of the set of components is stored in sequencing data structure 632. Sequencing data structure 632 is a data structure storing information identifying a sequence of software components for changing an operational state of a distributed software application. The information may be stored in an extensible markup language (XML) file usable to identify the sequence in which components of a set of components may be suspended or restarted. However, in alternate embodiments, sequencing data structure 632 may also be stored in a location and in a form that may be parsed and used by an executable program, such as in a table, list, or database.

Application component manager 630 may analyze the metadata of the various software components recursively to identify the collection of all software components of the set of software components that form the distributed software application. For example, application component manager 630 may determine, based upon an analysis of metadata 629 that application deployment manager component 618 depends on database server component 622 and that application server component 620 depends on application deployment manager component 618. In this manner, all the software components that form the distributed software application may be identified. Further, this analysis of the metadata 629 enables application component manager 630 to derive sequencing data structure 632 for changing an operational state of the distributed software application.

Once generated, sequencing data structure 632 may be stored in server 608 for use by application component manager 630 to change the operational state of the software components that form the distributed software application. Using sequencing data structure 632, application component manager 630 initiates the change of the operational state of the first software component listed in sequencing data structure 632. Once application component manager 630 detects that the operational state of the first component has completed, application component manager 630 initiates the change of the operational state of the second software component that depends upon the first software component. In other embodiments, the operational state of various software components may be changed simultaneously. For example, the operation of two software components may depend upon a common software component. Once the operational state of the common software component has been changed, then the operational state of the two remaining software components may be initiated at the same time.

In yet another embodiment, application component manager 630 may present sequencing data structure 632 to a user (not shown) for verification before changing the operational state of the set of software components. Sequencing data structure 632 may be presented to a user in any format, including a text file or a graphical file. The text file may be, for example, in the form of a tree diagram. In addition, sequencing data structure 632 may be presented to a user in a graphical format where the various software components are represented by nodes. Each node is tied to another node according to the set of dependencies associated with each software component. An exemplary illustration depicting a sequence for changing the operational state of a distributed software application is provided in FIG. 8.

A software component may be started and stopped on the same physical or virtual machine. Further, a software component may be stopped on one physical or virtual machine and restarted on a different physical or virtual machine. In particular, stateless applications may be easily stopped on one physical or virtual machine and restarted on another physical or virtual machine. This transfer would be possible so long as the second machine is assigned the same IP address of the first machine, or if a front-end router is directed to change any request directed to the component to the address of the second machine. The transfer of software components having states requires the completion of state transfers. A state is a set of properties possessed by a software component at a given point in time. For example, a computer game permitting a user to continually save a user's progress is a software application having a state.

Although in FIG. 6, application component manager 630 is depicted as being hosted in server 608, in alternate embodiments, application component manager 630 may be stored in any other physical or virtual computing device. For example, application component manager 630 may be executing in computing devices 602, 604, or 606, as well as in virtual machines 612, 614, or 616. Further, although virtual machines 612, 614, and 616 are depicted as executing in separate computing devices, in an alternate embodiment, virtual machines 612, 614, and 616 may reside on a single computing device, such as computing device 602.

In addition, the software components that form the distributed software application may execute on at least one of a set of virtual machines and a set of physical machines. In other words, the software components may be executing on one or more virtual machines, one or more physical machines, or a combination of virtual and physical machines.

Figure 7:
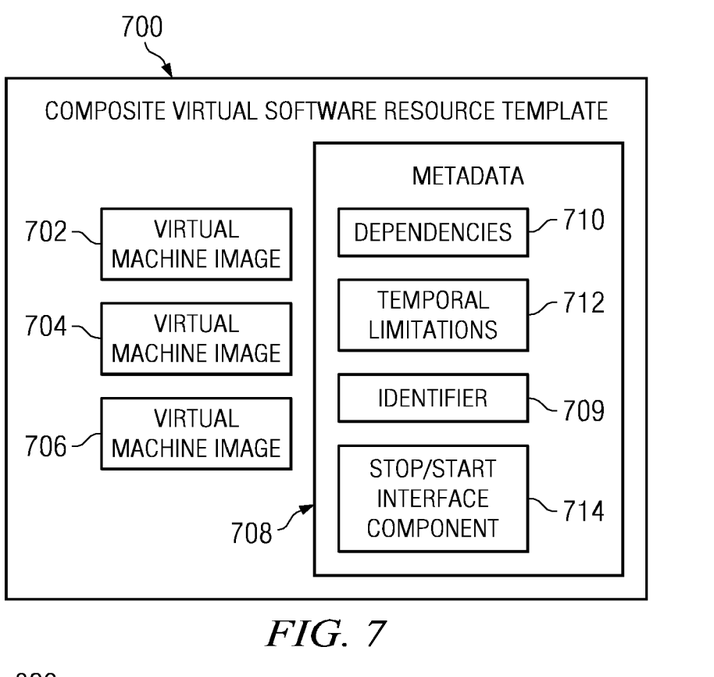
FIG. 7 is a diagram of virtual software resource templates used in identifying a sequence for changing an operational state of a distributed software application in accordance with an illustrative embodiment.

Turning now to FIG. 7, a diagram of a composite virtual software resource template for use in identifying a sequence for changing an operational state of a distributed software application is depicted in accordance with an illustrative embodiment. Composite virtual software resource template 700 is a composite virtual software resource template such as composite virtual software resource template 624 in FIG. 6.

Composite virtual software resource template 700 includes virtual machine images 702, 704, and 706. Virtual machine images 702, 704, and 706 are virtual machine images such as virtual machine image 628 in FIG. 6. Composite virtual software resource template 700 also includes metadata 708. Metadata 708 is metadata such as metadata 629 in FIG. 6.

Metadata 708 includes identifier 709. Identifier 709 is a globally unique identifier that may be used as a primary key for machine identification of the virtual software resource template. Identifier 709 may also be a name is a unique name for the user identification of a virtual software resource template.

Metadata 708 also includes dependencies 710. Dependencies 710 is metadata indicating dependencies of the software components of the set of software components that form the distributed software application. In this illustrative example, dependencies 710 describes the dependencies of the software components hosted by virtual machine images 702, 704, and 706 that form the distributed software application discussed in FIG. 6. Dependencies 710 may be expressed declaratively or procedurally. In a declarative expression, the dependency of a software component may be captured by a variable in an extensive markup language file. A procedural description may be an executable script that resolves dependencies of software components hosted by virtual machine images 702, 704, and 706.

Metadata 708 also includes temporal limitations 612. Temporal limitations 712 is metadata describing the temporal limitations of the software components of the set of software components that form the distributed software application. In this illustrative example, temporal limitations 712 describes the temporal limitations of the software components hosted by virtual machine images 702, 704, and 706 that form the distributed software application discussed in FIG. 6.

The data of dependencies 710 and temporal limitations 712 are formed from data associated with the set of software components. The data associated with the set of software components may be, for example, at least one of configuration data, application logs, and application code. In other words, the data associated with the set of software components may be either configuration data, application logs, application code, or any combination of the three. In one example, dependencies 710 may describe the dependency of one software component upon another, such as the dependency of application server component 620 upon application deployment manager component 618 in FIG. 6. The dependency of application server component 620 may be indicated in a pointer in the application code of application server component 620 and/or a pointer in the application code of application deployment manager component 618. This dependency may be identified and described in dependencies 710 when composite virtual software resource template 700 is formed.

Metadata 708 also includes stop/start interface component 714. Stop/start interface component 714 is an interface that directs an application component manager, such as application component manager 630 in FIG. 6, to the script configured for stopping and/or starting a software component of a distributed software application, such as application server component 620 in FIG. 6.

In other embodiments, metadata 708 may include other data elements including, without limitation, a name, a version, a description, capabilities, capacity, cost of instantiation, and constituent virtual software resource templates.

A version refers to the version of the virtual software resource template. The description is a short description of the functionality provided by the virtual software resource template. The description may function as a miniature README file for the solution. Capabilities are metadata that express or explain the capabilities provided by the virtual software resource template, for example, a J2EE® application server, a servlet container, and so forth.

The capacity identifies the capacity of the virtual software resource template, provided that the hardware and software requirements are met. An example of capacity is the number of clients that the virtual software resource template is capable of serving. The cost of instantiation is metadata that identifies the cost associated with the instantiation of the virtual software resource template into a virtual software resource (VSR). Cost refers to the time taken to perform the function. The cost information can be used, for example, by a utility function to decide whether creating a new instance of a virtual software resource template in response to an increased workload of short duration would be worthwhile.

The constituent virtual software resource template's metadata comprises information about the virtual software resource template that makes up the distributed application, such as an IT Service Management data server or IT Service Management User Interface server. The constituent virtual software resource template's metadata takes the form of one or more entries. Each entry comprises an identifier and a role. The identifier is the identifier of the base virtual software resource template. The role describes the role the software stack in the base virtual software resource template will play in the solution described by the composite virtual software resource template.

For example, a WebSphere® application server software stack may play the role of a deployment manager or an application server or both. It should be noted that the constituent virtual software resource templates referred to in a composite virtual software resource template may themselves be either base or composite virtual software resource templates. Thus, composite virtual software resource templates may be nested.

Information of metadata 708 may be extracted by an application component manager for use in creating a sequence for changing the operational state of a set of software components forming a distributed software application. The component manager, such as application component manager 630 in FIG. 6, may extract the information from metadata 708 using any commonly available means, including, without limitation, at least one of static compiler analysis, dynamic analysis, data mining, and rule-based system analysis. In other words, information may be extracted from metadata 708 by either static compiler analysis, dynamic analysis, data mining, or rule-based system analysis, or any combination thereof.

Figure 8:
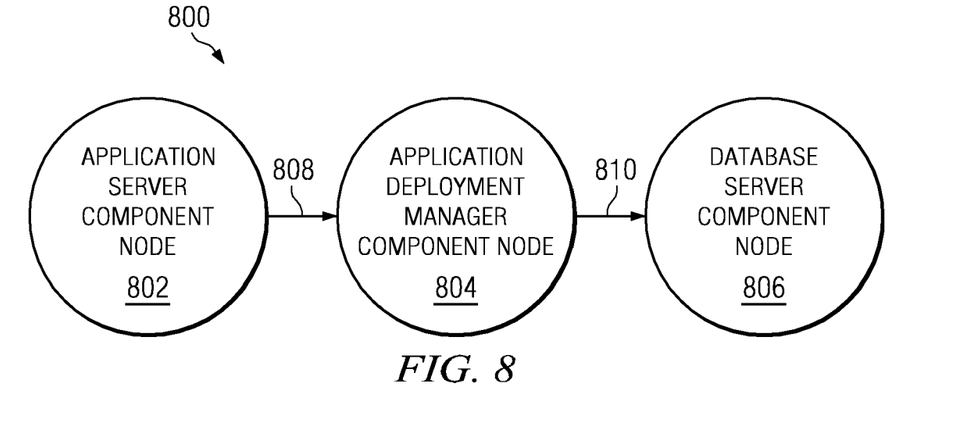
FIG. 8 is a pictorial representation of a sequence for changing an operational state of a distributed software application in accordance with an illustrative embodiment.

Turning now to FIG. 8, a pictorial representation of a sequence for changing an operational state of a distributed software application is depicted in accordance with an illustrative embodiment. Sequence 800 is a sequence, such as the sequence stored in sequencing data structure 632 in FIG. 6, for changing the operational state of a distributed software application. In the illustrative example in FIG. 8, sequence 800 is a sequence for changing the operational state of the set of software components forming a distributed software application, such as the distributed software application in FIG. 3.

Sequence 800 includes a node corresponding to each software component of the set of software components that forms the distributed software application. Thus, sequence 800 includes application server component node 802, application deployment manager component node 804, and database server component node 806. Each node is attached to another node by a connector based upon a dependency of the nodes. For example, application server component node 802 is connected to application deployment manager component node 804 by connector 808. The direction in which connector 808 is pointing depicts the dependencies of the node from which the connector originated. For example, connector 808 points from application server component node 802 to application deployment manager component node 804 to show that application server component node 802 depends upon application deployment manager component node 804. Likewise, connector 810 points from application deployment manager component node 804 to database server component node 806 to show that application deployment manager component node 804 depends on database server component node 806.

The sequence depicted by sequence 800 may be used by an application component manager, such as application component manager 630 in FIG. 6 to change the operational state of the software components of the set of software components that form the distributed software application. In addition, sequence 800 may be presented to a user to verify the accuracy of the dependencies depicted in sequence 800.

Figure 9:
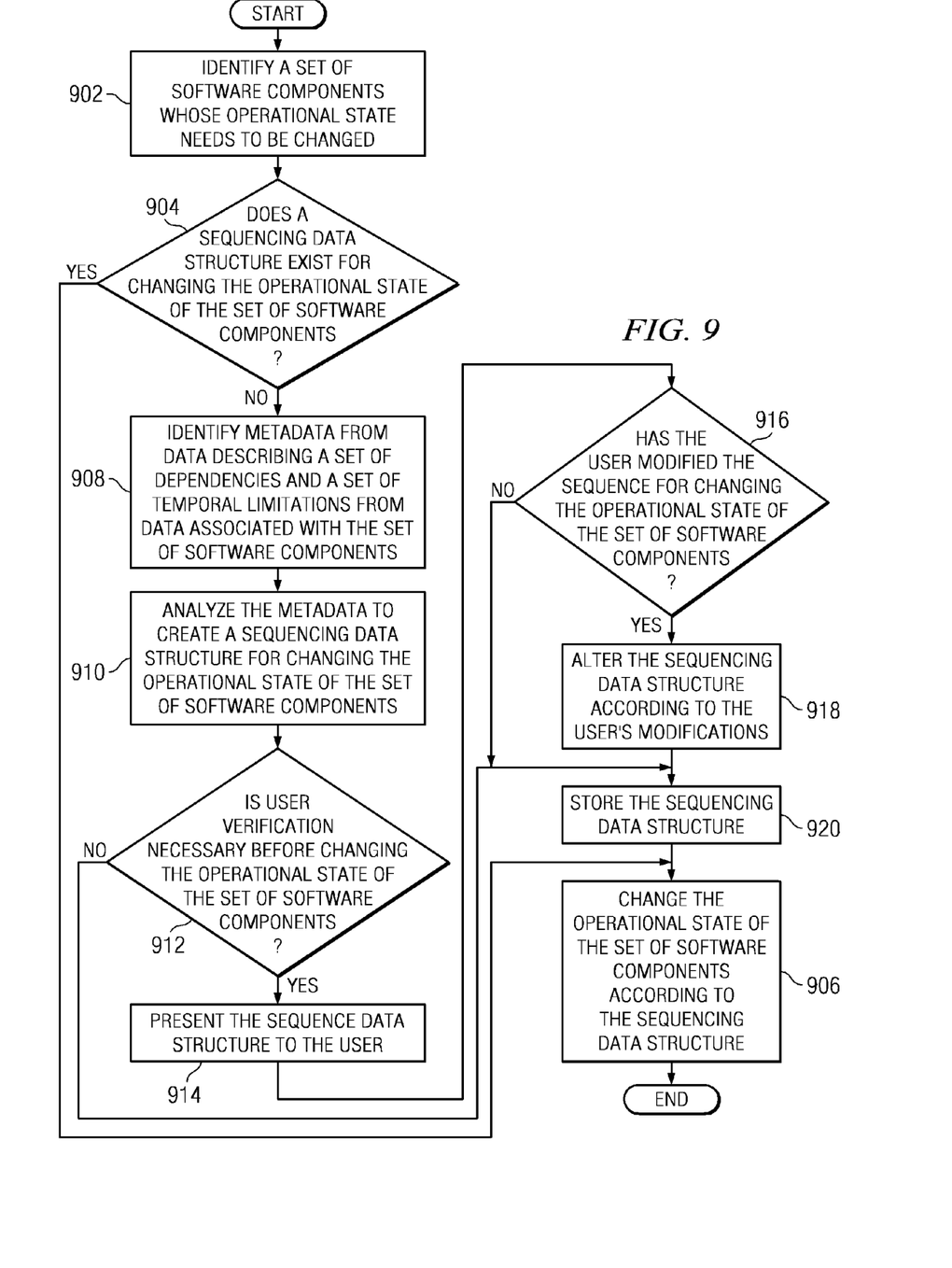
FIG. 9 is a flowchart illustrating a process for managing a distributed software application comprising a set of software components in accordance with an illustrative embodiment.

Turning now to FIG. 9, a flowchart of a process for managing a distributed software application comprising a set of software components is depicted in accordance with an illustrative embodiment. The process may be performed by a software component, such as application component manager 630 in FIG. 6.

The process begins by identifying a set of software components whose operational state needs to be changed (step 902). The process may identify the set of software components by any existing means. For example, the process may identify the set of software components by receiving an instruction from a user identifying the set of software components. In addition, the process may also identify the distributed software application automatically, as in the instance where a software application undergoes scheduled maintenance at predetermined times.

The process then makes the determination as to whether a sequencing data structure exists for changing the operational state of the set of software components (step 904). If the process makes the determination that the a sequencing data structure does exist for changing the operational state of the set of software components, the process changes the operational state of the set of software components according to the sequencing data structure (step 906). The process may change the operational state of the set of software components by traversing and the process terminates thereafter.

Returning now to step 904, if the process makes the determination that a sequencing data structure does not exist for changing the operational state of the set of software components, then the process identifies metadata describing a set of dependencies and a set of temporal limitations from data associated with the set of software components (step 908). The set of dependencies may be identified by referencing metadata, such as dependencies 710 in FIG. 7. Similarly, the set of temporal limitations may be identified by referencing metadata, such as temporal limitations 712 in FIG. 7.

Thereafter, the process analyzes the metadata to create a sequencing data structure that stores a sequence for changing the operational state of the set of software components (step 910). The process then makes the determination as to whether user verification is necessary before changing the operational state of the set of software components (step 912). A systems administrator or other user may be required to verify, for example, a lengthy sequence for changing a set of software components having complex dependencies. In addition, user verification may be necessary in instances where certain business rules exist that prevent fully automated processes for changing operational states from executing without a user verifying the accuracy of the identified dependencies.

If the process makes the determination that user verification is necessary before changing the operational state of the set of software components, then the process presents the sequencing data structure to the user (step 914). The sequencing data structure may be presented to the user in any form, including the dependency graph represented by sequence 800 in FIG. 8.

Next, the process makes the determination as to whether the user has modified the sequence for changing the operational state of the set of software components (step 916). If the process makes the determination that the user has modified the sequence for changing the operational state of the set of software components, then the process alters the sequencing data structure according to the user's modifications (step 918). Thereafter, the process stores the sequencing data structure (step 920). The sequencing data structure may be stored in a storage device, such as storage 108 in FIG. 1 or on a remote server, such as server 608 in FIG. 6. The process then continues to step 906.

Returning now to step 912, if the process makes the determination that user verification is not necessary before changing the operational state of the set of software components, the process continues to step 920.

With reference again to step 916, if the process makes the determination that the user has not modified the sequence, then the process continues to step 920.

Figure 10:
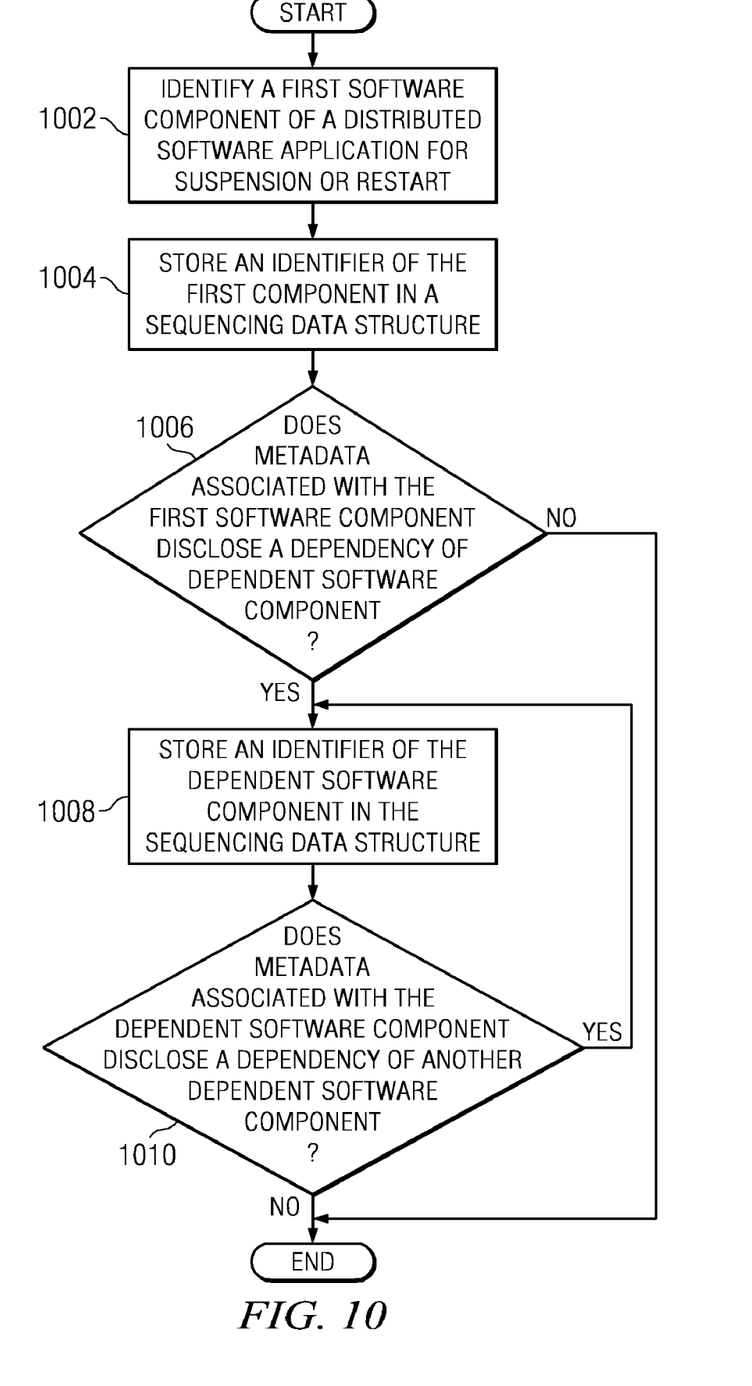
FIG. 10 is a flowchart of a process for identifying a sequence of software components for changing the operational state of a distributed software application in accordance with an illustrative embodiment.

FIG. 10 is a flowchart of a process for creating a sequence of software components for changing the operational state of a distributed software application in accordance with an illustrative embodiment. The process may be performed by a software component, such as application component manager 630 in FIG. 6.

The process begins by identifying a first software component of a distributed software application for suspension or restart (step 1002). The process stores an identifier of the first component in a sequencing data structure (step 1004). Thereafter, the process makes the determination as to whether the metadata associated with the first software component discloses a dependency of dependent software component (step 1006).

If the process makes the determination that the metadata associated with the first software component does not disclose a dependency of a dependent software component, then the process terminates thereafter. However, if the process makes the determination that the metadata associated with the first software component does disclose a dependency of a dependent software component, then the process stores an identifier of the dependent software component in the sequencing data structure (step 1008).

Thereafter, the process makes the determination as to whether metadata associated with the dependent software component discloses a dependency of another dependent software component (step 1010). If the process makes the determination that metadata associated with the dependent software component does not disclose a dependency of another dependent software component, the process terminates thereafter. However, if the process makes the determination that metadata associated with the dependent software component discloses a dependency of another dependent software component, then the process returns to step 1008.

The flowcharts and block diagrams in the different depicted embodiments illustrate the architecture, functionality, and operation of some possible implementations of methods, apparatus, and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The illustrative embodiments described herein provide a computer implemented method, apparatus, and computer usable program product for managing a distributed software application. The process identifies metadata describing a set of dependencies of a set of software components in the distributed software application from data associated with the set of software components. The process then identifies a sequence for changing an operational state of the set of software components of the distributed software application from the metadata to form an identified sequence. Thereafter, the process changes the operational state of the set of software components using the identified sequence.

Using this method, apparatus, and computer program product, an operational state of a distributed software application may be easily and efficiently changed. A systems administrator or other user would not be required to develop a detailed sequence for changing the operational state of the software components of the distributed software application. Further, modifications of the distributed software application, such as the removal or addition of software components may be easily incorporated into the sequence by altering the metadata of the software components dependent upon the removed or added software component. Thus, the exemplary embodiments provide for a simplified method of managing a distributed software application.

The invention can take the form of an entirely hardware embodiment, an entirely software embodiment, or an embodiment containing both hardware and software elements. In a preferred embodiment, the invention is implemented in software, which includes, but is not limited, to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing a distributed software application, the computer implemented method comprising:
   identifying metadata describing a set of dependencies of a set of software components in the distributed software application from data associated with the set of software components, wherein the metadata is included in a template that includes a set of virtual machine images, each virtual machine image in the set of virtual machine images is a virtual machine that hosts a different software component in the set of software components;
   identifying a sequence for changing an operational state of the set of software components of the distributed software application from the metadata to form an identified sequence; and
   changing the operational state of the set of software components using the identified sequence, wherein the metadata further describes a set of temporal limitations that is one or more time-based conditions specifying a window of time when a software component in the set of software components is not available to change the operational state of the software component.

2. The computer implemented method of claim 1, further comprising:
   responsive to forming the identified sequence, presenting the identified sequence for verification before changing the operational state of the set of software components.

3. The computer implemented method of claim 1, wherein changing the operational state of the set of software components comprises suspending an activity of the set of software components.

4. The computer implemented method of claim 1, wherein changing the operational state of the distributed software application comprises:
   restarting the set of software components after an activity of the set of software components has been suspended.

5. The computer implemented method of claim 4, wherein the set of software components are restarted on a remote computing device.

6. The computer implemented method of claim 1, wherein the data associated with the set of software components is at least one of configuration data, application logs, and application code.

7. The computer implemented method of claim 1, wherein the metadata is identified by at least one of static compiler analysis, dynamic analysis, rule-based system analysis, and data mining.

8. The computer implemented method of claim 1, wherein the changing step further comprises:
   responsive to detecting that a first operational state of a first software component has completed, initiating a change of a second operational state of a second software component.

9. A computer program product for managing a distributed software application, the computer program product comprising:
   a computer recordable storage medium;
   program code stored on the computer recordable storage medium for parsing data associated with a set of software components to extract metadata describing a set of dependencies of the set of software components, wherein the metadata is included in a template that includes a set of virtual machine images, each virtual machine image in the set of virtual machine images is a virtual machine that hosts a different software component in the set of software components;
   program code stored on the computer recordable storage medium for analyzing the metadata to identify a sequence for changing an operational state of the set of software components of the distributed software application to form an identified sequence; and
   program code stored on the computer recordable storage medium for changing the operational state of the distributed software, wherein the metadata further describes a set of temporal limitations that is one or more time-based conditions specifying a window of time when a software component in the set of software components is not available to change the operational state of the software component.

10. The computer program product of claim 9, further comprising:
    program code stored on the computer recordable storage medium for presenting the sequence to a user for verification before changing the operational state of the set of software components in response to forming the identified sequence.

11. The computer program product of claim 9, wherein the program code stored on the computer recordable storage medium for changing the operational state of the set of software components comprises program code stored on the computer recordable storage medium for suspending an activity of the set of software components.

12. The computer program product of claim 9, wherein the program code stored on the computer recordable storage medium for changing the operational state of the distributed software application comprises program code stored on the computer recordable storage medium for restarting the set of software components after an activity of the set of software components has been suspended.

13. The computer program product of claim 12, wherein the set of software components are restarted on a remote computing device.

14. The computer program product of claim 9, wherein the data associated with the set of software components is at least one of configuration data, application logs, and application code.

15. The computer program product of claim 9, wherein the metadata is identified by at least one of static compiler analysis, dynamic analysis, rule-based system analysis, and data mining.

16. The computer program product of claim 9, wherein the program code stored on the computer recordable storage medium for performing the changing of the operational state of the distributed software application further comprises:
program code stored on the computer recordable storage medium for initiating a change of a second operational state of a second software component in response to detecting that a first operational state of a first software component has completed.

17. The computer program product of claim 9, wherein the metadata further describes a set of temporal limitations.

18. A system for managing a distributed software application comprising a set of software components, the system comprising:
a set of machines, wherein the set of machines are operable for executing the set of software components, and wherein the set of machines comprise at least one of a set of virtual machines and a set of physical machines; and
an application component manager, wherein the application component manager identifies metadata describing a set of dependencies of the set of software components in the distributed software application from data associated with the set of software components, wherein the metadata is included in a template that includes a set of virtual machine images, each virtual machine image in the set of virtual machine images is a virtual machine that hosts a different software component in the set of software components; identifies a sequence for changing an operational state of the set of software components of the distributed software application from the metadata to form an identified sequence; and changes the operational state of the set of software components using the identified sequence, wherein the metadata further describes a set of temporal limitations that is one or more time-based conditions specifying a window of time when a software component in the set of software components is not available to change the operational state of the software component.

19. An apparatus comprising:
a bus system;
a processor unit connected to the bus system;
a storage device connected to the bus system, wherein the storage device stores program code executed by the processor unit for identifying metadata describing a set of dependencies of a set of software components in a distributed software application from data associated with the set of software components, wherein the metadata is included in a template that includes a set of virtual machine images, each virtual machine image in the set of virtual machine images is a virtual machine that hosts a different software component in the set of software components; identifying a sequence for changing an operational state of the set of software components of the distributed software application from the metadata to form an identified sequence; and changing the operational state of the set of software components using the identified sequence, wherein the metadata further describes a set of temporal limitations that is one or more time-based conditions specifying a window of time when a software component in the set of software components is not available to change the operational state of the software component.

* * * * *